United States Patent
Sarkar et al.

(10) Patent No.: US 11,651,390 B1
(45) Date of Patent: May 16, 2023

(54) COGNITIVELY IMPROVING ADVERTISEMENT EFFECTIVENESS

(71) Applicant: International Business Machines Corporation, Armonk, NY (US)

(72) Inventors: Sanmitra Sarkar, Kolkata (IN); Mukundan Sundararajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/554,005

(22) Filed: Dec. 17, 2021

(51) Int. Cl.
*G06Q 30/02* (2023.01)
*G06Q 30/0242* (2023.01)
*G06N 20/00* (2019.01)

(52) U.S. Cl.
CPC ......... *G06Q 30/0244* (2013.01); *G06N 20/00* (2019.01)

(58) Field of Classification Search
CPC ........................... G06Q 30/0244; G06N 20/00
See application file for complete search history.

(56) References Cited

U.S. PATENT DOCUMENTS

| | | | |
|---|---|---|---|
| 2011/0173190 A1* | 7/2011 | van Zwol | G06F 16/58 707/723 |
| 2016/0012475 A1 | 1/2016 | Liu | |
| 2016/0125472 A1* | 5/2016 | Lee | G06Q 30/0242 705/14.66 |
| 2018/0012258 A1* | 1/2018 | Walker | G06Q 30/0242 |
| 2019/0325479 A1 | 10/2019 | Perrone | |
| 2019/0377830 A1* | 12/2019 | Weldemariam | G06F 40/106 |
| 2022/0005081 A1* | 1/2022 | Teller | G06T 19/006 |

FOREIGN PATENT DOCUMENTS

| | | |
|---|---|---|
| CN | 106920129 A | 7/2017 |
| CN | 108960937 A | 12/2018 |

OTHER PUBLICATIONS

Lewinski, P., Fransen, M. L., & Tan, E. S. H. Predicting advertising effectiveness by facial expressions in response to amusing persuasive stimuli. Journal of Neuroscience, Psychology, and Economics, 7(1), 1-14. (Year: 2014).*

"IBM Launches Advertising Accelerator with Watson", IBM Newsroom, Jan. 7, 2020, 3 pages, <https://newsroom.ibm.com/2020-01-07-IBM-Launches-Advertising-Accelerator-with-Watson>.

* cited by examiner

*Primary Examiner* — Waseem Ashraf
*Assistant Examiner* — Christopher C Busch
(74) *Attorney, Agent, or Firm* — Erika R. DeCosty

(57) ABSTRACT

A computer-implemented method includes one or more processors configured for receiving ad scoring data corresponding to a biometric response to an advertisement displayed on a computing device user interface at a first time, receiving ad feature data corresponding to the advertisement, and generating first model output data corresponding to a user engagement score based on ad scoring data and ad feature data. Further, the method includes receiving user interface activity data corresponding to graphical images displayed at the first time, generating second model output data corresponding to a watching ad classification based on the user interface activity data and the ad feature data, determining an ad effectiveness score based on the first model output data and the second model output data, and generating ad improvement data based on the ad effectiveness score and the ad feature data, the ad improvement data comprising recommendations to adjust features of the advertisement.

20 Claims, 6 Drawing Sheets

COGNITIVELY IMPROVING ADVERTISEMENT EFFECTIVENESS

BACKGROUND

The present invention relates generally to the field of analyzing advertisement (ad) effectiveness, and more particularly to cognitively improving ad effectiveness.

Various key performance indicators (KPIs) are used to measure ad effectiveness in media platforms and the Internet's digital world. For example, KPIs include metrics such as return on ad spends, cost per acquisition, website conversions, click-through rate, cost and earning per click, cost per thousand impressions, etc. Many of the KPIs provide some measure of a user's awareness or consumption of the advertising content and is based at least on the user's activity or interaction with during the advertisement's display.

SUMMARY

The present invention is described in various embodiments disclosing computer-implemented methods, computer program products, and computer systems for cognitively improving advertisement effectiveness. One embodiment of the present disclosure is a computer-implemented method for cognitively improving advertisement effectiveness, the computer-implemented method includes one or more processors configured for receiving at a first machine learning model, ad scoring data corresponding to a biometric response to an advertisement displayed on a user interface of a computing device at a first time, receiving at the first machine learning model, ad feature data corresponding to the advertisement and generating by the first machine learning model, first model output data corresponding to a user engagement score based on the ad scoring data and the ad feature data. Further, the computer-implemented method may include one or more processors configured for receiving user interface activity data corresponding to one or more graphical images displayed on the user interface at the first time, generating at a second machine learning model, second model output data corresponding to a watching ad classification based on the user interface activity data and the ad feature data, determining an ad effectiveness score based on the first model output data and the second model output data, and generating ad improvement data based on the ad effectiveness score and the ad feature data, the ad improvement data comprising recommendations to adjust one or more features of the advertisement.

DETAILED DESCRIPTION

Figure 1:
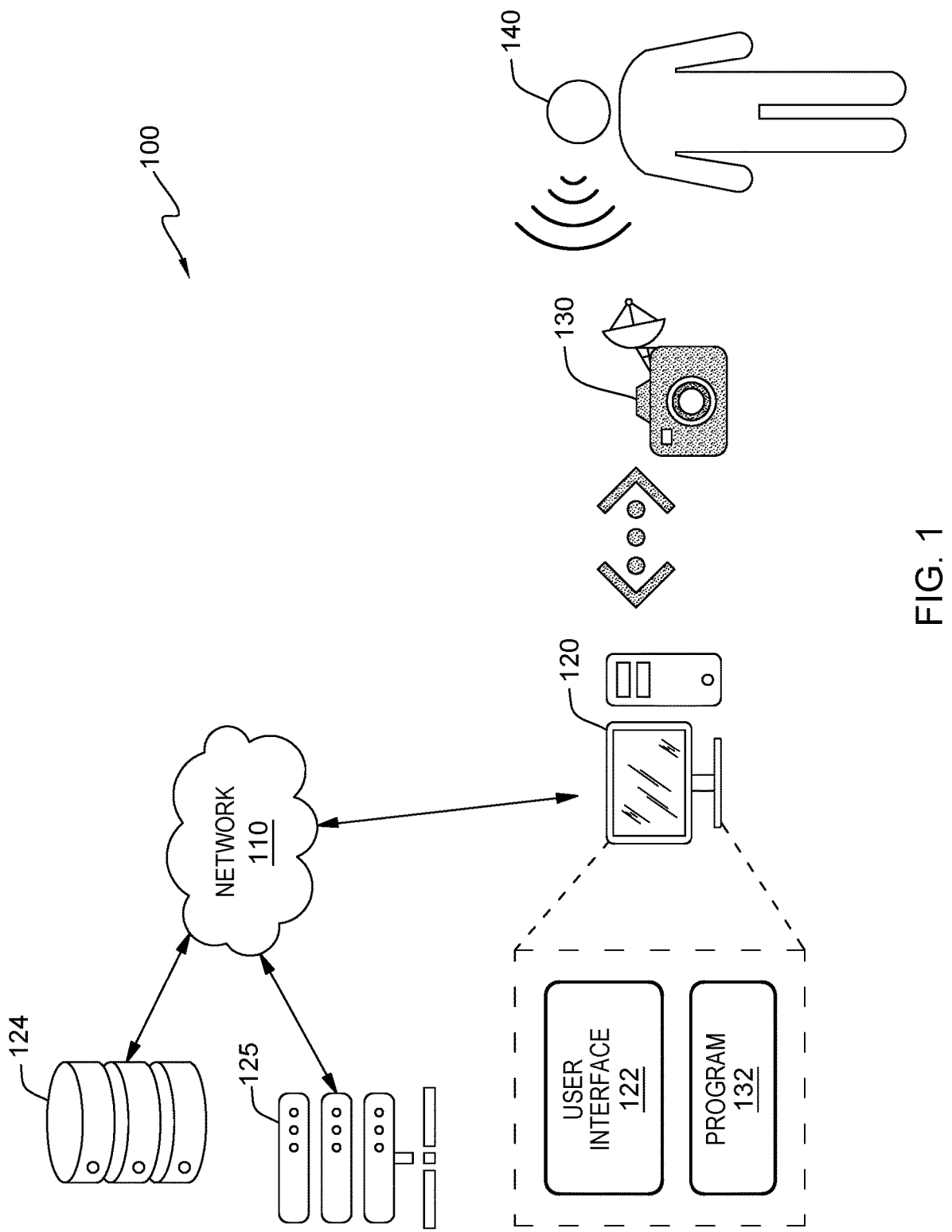
FIG. 1 depicts a block diagram of a distributed network environment for cognitively improving advertisement effectiveness, in accordance with an embodiment of the present invention.

Embodiments of the present invention recognize that there are different Key Performance Indicators (KPIs) to measure advertisement (ad) effectiveness. For example, some KPIs may include return on ad spends, cost per acquisition, website conversions, click-through rate, cost and earning per click, and cost per thousand impressions, etc. Even if a mobile device user remains engaged a webpage or a software application, such engagement does not ensure that the user has viewed an ad that was displayed during the engagement. Therefore, a viewer engagement level is not a direct measure of whether the user has viewed the ad, rendering the ad's effectiveness uncertain.

Embodiments of the present invention also recognize that determining whether a consumer has actually viewed an ad is important to measure effectiveness of the ad and is helpful in determining the user's engagement level, measure of interest and message communicated to form a linkage between the user and the user's likelihood to purchase the product or service described in the ad.

Embodiments described herein provide a computer software program (e.g., application) configured to measure a viewing angle of an eye, wherein the viewing angle may be detected and measured using an Internet of Things (IoT) device including sensors configured to perform eye muscle tracking. The eye viewing angle may corresponding to an angle in which the user has watched the ad. For example, the computer software program may be configured to receive data corresponding to a user's eye viewing angle to determine the user's attention focus. A user's eye viewing angle measurement may be based on measuring the lateral rectus (i.e., lateral eye rotation), the superior oblique (i.e., downward lateral eye rotation), and the inferior oblique (i.e., upward lateral eye rotation).

Embodiments described herein may include a biometric reader (e.g., electroencephalogram (EEG)) configured to detect brain waves on a macroscopic level. For example, the computer software program may be configured to receive data corresponding to brain waves of a user to determine brain activity associated with the user viewing an ad.

Embodiments described herein may be configured to determine a level of user focus by measuring facial feature (e.g., facial skin, eye templates) muscular movements (i.e., sub-cutaneous). Such facial feature muscle movements may be measured to generate a biometric template. Furthermore, a user's level of engagement may be determined based on the EEG and/or focus-time measurements. Therefore, embodiments described herein may be configured to measure the effectiveness KPI towards higher interest and/or product purchases.

Embodiments of the present invention may be configured to perform ad effectiveness analysis, wherein a user computing device may include one or more processors configure for receiving biometric data corresponding to a user's eye movements and brain activity. Further, the biometric data may be processed by a machine learning model to generate model output data corresponding to a user's engagement level with ad displays that were viewed by the user.

Embodiments of the present invention may include one or more processors configured for determining a viewer engagement score. For example, the one or more processors may be configured to receive data corresponding to eye position of the user focused on an ad element at the element position at the first time. Further the eye position may be determined based on a timing in a particular position on the ad's display and process the data using a machine learning algorithm to generate model output data corresponding to the viewer (e.g., user) engagement score. In an embodiment, input data to the machine learning model may include sensor data corresponding to facial feature muscle movement on a temporal x-axis. Further, noise correction factors may also be included in the input data as hidden or static inputs. Further, the machine learning model may be configured to split the model input data between gross and fine facial feature muscle movements to determine focus points through angular displacement and eye lens flexing. Furthermore, the one or more processors may be configured to determine an amount of time spent at focused points, wherein data corresponding to the amount of time spent may be used in determining a level of interest or engagement with information gleaned or gained from the ad. Even further, the one or more processors may be configured to process the model input data to generate model output data from the machine learning model, wherein the model output data may correspond to the cluster to which the user/instance is assigned to.

Embodiments of the present invention may include one or more processors configured for determining, based on the model output data, engagement KPIs corresponding to time on page, bounce rate, page/scroll depth, clicking additional information links, etc. For example, the engagement KPIs may be represented as an engagement score corresponding to a function that is based on an average of ad engagement features. In an embodiment, ad engagement features may include high and low times spent at focus points, output cluster for the user/instance, information at the focus points, repeat movement to a focus point, bounce rate, scroll depth, clicks on the ad space on provided links, etc.

Embodiments of the present invention may be configured to adjust ad features (e.g., position, color, font) based on the user's engagement level with the particular ad, wherein the ad feature adjustments may increase the user's engagement level with the particular ad. For example, if a first version of the ad includes a left alignment ad feature that is determined to produce a user engagement level that is less than a satisfactory threshold, then the ad feature adjustment may be configured to generate a second version of the ad that includes a central alignment to increase the user engagement level greater than the satisfactory threshold.

Embodiments of the present invention may include a machine learning model configured to assess user engagement based on user eye muscle movement versus user eye position angle. For example, the machine learning model may be configured to receive data corresponding to historical positions of the eye muscle movement and plot the historical positions against the eye angular displacement in degrees. Thus, user engagement levels may be determined based on the model output data corresponding to the plot and other user biometric measurements gathered and made available by a client (e.g., ad agency).

Embodiments of the present invention may include a noise correction machine learning model configured to determine that the user viewing the ad is not watching anything else apart from the ad.

The present invention will now be described in detail with reference to the Figures.

FIG. 1 depicts a block diagram of a distributed network environment 100 for cognitively improving advertisement effectiveness, in accordance with an embodiment of the present invention. FIG. 1 provides only an illustration of one embodiment of the present invention and does not imply any limitations with regard to the environments in which different embodiments may be implemented. Distributed network environment 100 represents a computer system for cognitively improving advertisement effectiveness. In the depicted embodiment, the distributed network environment 100 includes computing device 120 in communication with network 110. Computing device 120 may also be communicatively coupled to biometric sensor 130. Biometric sensor 130 may be a special purpose biometric sensor configured to capture images and record biometric data corresponding eye movements from user 140. Distributed network environment 100 may include database(s) 124 and server(s) 125 in communication with network 110. Distributed network environment 100 may also include additional servers, computers, sensors, or other devices not shown.

Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between computing device 120. It is further understood that in some embodiments network 110 is optional and the distributed data processing environment 100 for cognitively improving advertisement effectiveness can operate as a stand-alone system, where in other embodiments, network 110 may be configured to enable computing device 120 and biometric sensor 130 to share a joint database using network 110.

User interface 122 operates as a local user interface on computing device 120 through which one or more users of computing device 120 interact with computing device 120. In some embodiments, user interface 122 is a local app interface of program 132 (e.g., software configured to execute the steps of the invention described herein) on computing device 120. In some embodiments, user interface 122 is a graphical user interface (GUI), a web user interface (WUI), and/or a voice user interface (VUI) that can display (i.e., visually), present (i.e., audibly), and/or enable a user to enter or receive information (i.e., graphics, text, and/or sound) for or from the program via network 110. In an embodiment, user interface 122 enables a user to transmit and receive data (i.e., to and from the program via network 110, respectively). In an embodiment, user interface 122 enables a user to opt-in to the program, input user related data, and receive alerts.

Database 124 may operate as a repository for data associated with server 125, computing device 120, biometric sensor 130, and other data transmitted within network 110. A database is an organized collection of data. Database 124 can be implemented with any type of storage device capable of storing data and configuration files that can be accessed and utilized by computing device 120, such as a database server, a hard disk drive, or a flash memory. In an embodiment, database 124 is accessed by computing device 120 to store data corresponding to images or brain activity captured by biometric sensor 130. In another embodiment, database 124 is accessed by computing device 120 to access user data, device data, network data, and data corresponding to images, facial feature movement, and brain activity captured by biometric sensor 130. In another embodiment, database 124 may reside elsewhere within distributed network environment 100 provided database 124 has access to network 110.

Database 124 can be implemented with any type of storage device capable of storing data and configuration files that can be accessed and utilized by either of computing device 120 or biometric sensor 130, such as a database server, a hard disk drive, or a flash memory. In an embodiment, database 124 may be accessed by computing device 120 or biometric sensor 130 to store data associated with computing device 120 or biometric sensor 130. In another embodiment, database 124 may be accessed by computing device 120 or biometric sensor 130 to access data as described herein.

Database 124 may also operate as a repository for data flowing through network 110. Examples of data include user data, device data, network data, individual profile data, ad scoring data, ad feature data, model input data, model output data, user interface activity data, user device activity data, biometric dynamics data, ad agency user data, ad improvement data, and data corresponding to images and biometric data captured by biometric sensor 130.

In the depicted embodiment, server(s) 125 may contain program 132 (e.g., software configured to execute the steps of the invention described herein) and database 124. In some embodiments, server(s) 125 can be a standalone computing device(s), a management server(s), a web server(s), a mobile computing device(s), or any other electronic device(s) or computing system(s) capable of receiving, sending, and processing data. In some embodiments, server 125 may be a laptop computer, tablet computer, netbook computer, personal computer (PC), a desktop computer, a smart phone, or any programmable electronic device capable of communicating with computing device 120 via network 110. In other embodiments, server(s) 125 represents a server computing system utilizing multiple computers as a server system, such as a cloud computing environment. In yet other embodiments, server(s) 125 represents a computing system utilizing clustered computers and components (e.g., database server computers, application server computers, etc.) that act as a single pool of seamless resources when accessed within distributed data processing environment 100. Server(s) 125 may include components as described in further detail in FIG. 6.

Computing device 120 may be an electronic device configured for accompaniment with a user. Computing device 120 may be a personal electronic device such as a mobile communications device, smart phone, tablet, personal digital assistant, smart wearable device, personal laptop computer, desktop computer, or any other electronic device configured for user interaction and gathering individual information to generate an individual profile. Computing device 120 may include components as described in further detail in FIG. 6.

Computing device 120 may be configured to be controlled via a software application installed and executed thereon. Computing device 120, when connected to network 110, may convey usage data and other types of data corresponding to the device itself, or other devices connected via network 110, wherein the data may provide insights that are useful within the scope of the designed application.

For computing device 120, a device profile includes, but is not limited to, a user device identifier (ID), a device type (e.g., a smart watch, a smart phone), data usage patterns, and data usage models. Data usage patterns may include data type, data use frequency, and user device data use history. A device profile may be created for computing device 120 connected to network 110 within distributed processing environment 100. Computing device 120 may consider data usage patterns and data usage models in a device profile when determining whether to execute a data usage request by other devices connected to network 110 and within distributed data processing environment 100.

Computing device 120 operates to execute at least a part of the computer program for cognitively improving advertisement effectiveness. In an embodiment, computing device 120 may be communicatively coupled with biometric sensor 130 or biometric sensor 130 may be a component of computing device 120. Computing device 120 be configured to send and/or receive data from network 110 and biometric sensor 130. In some embodiments, computing device 120 may be a management server, a web server, or any other electronic device or computing system capable of receiving and sending data. In some embodiments, computing device 120 may be a laptop computer, tablet computer, netbook computer, personal computer (PC), a desktop computer, a smart phone, or any programmable electronic device capable of communicating with database(s) 124, server(s) 125 via network 110. Computing device 120 may include components as described in further detail in FIG. 6.

Computing device 120 may also be configured to receive, store, and process images captured on biometric sensor 130. For example, computing device 120 may be communicatively coupled to biometric sensor 130 and receive, via a communications link, data corresponding to images captured by biometric sensor 130. Computing device 120 may be configured to store the image data in memory of computing device 120 or transmit the image data to database(s) 124 or server(s) 125 via network 110. The image data may be processed by one or more processors of computing device 120 or by one or more processors associated with server(s) 125.

Biometric sensor may be configured to detect and capture biometric activity corresponding to a user's eye movements, facial feature movements, and brain activity (e.g., electrical pulses).

Figure 2:
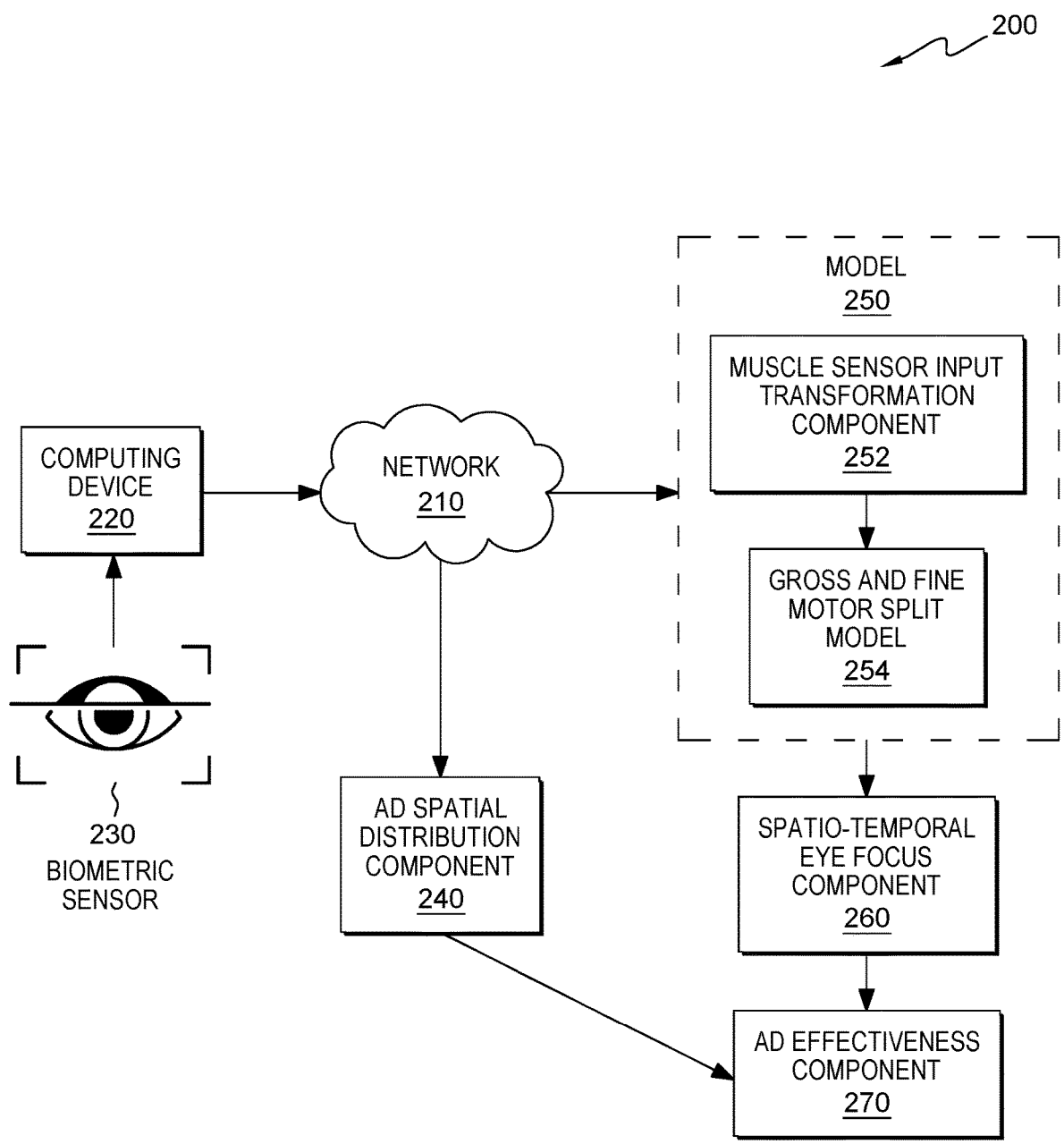
FIG. 2 depicts a system for cognitively improving advertisement effectiveness, in accordance with an embodiment of the present invention.

FIG. 2 depicts system 200 for cognitively improving advertisement effectiveness, in accordance with an embodiment of the present invention.

In an embodiment, system 200 may include computing device 220 in communication with biometric sensor 230, wherein data received from biometric sensor 230 may be transmitted to components within system 200 via network 210 to determine ad effectiveness. For example, computing device 220 may be configured for receiving biometric data from biometric sensor 230, wherein biometric data may be based on a biometric response to an advertisement displayed on a user interface of computing device 220.

In an embodiment, system 200 may include ad spatial distribution component 240 configured to determine ad spatial features corresponding to positions of ad features displayed within a user interface of computing device 220. For example, ad spatial distribution component 240 may be configured to receive ad feature data corresponding to features of an ad, wherein ad features may include color scheme, element types, element position, dynamic features, etc. Based on the ad feature data, ad spatial distribution component 240 may be configured to identify spatial features of elements displayed within the ad to assist in determining user engagement with the ad. For example, if a user is determined to be focused on a first portion of an ad for a period of time that exceeds a threshold for interest, then ad feature data may be processed to determine the specific ad feature that was displayed at the first portion of the ad and associate the specific ad feature with increased user engagement or interest. In an embodiment, ad spatial distribution component 240 may include the specification of the key messaging elements and expected duration of focus. Further, ad spatial distribution component 240 may include the focus shift expected from the dynamic movement of the content importance based on a temporal sequence of the messaging in the ad.

In an embodiment, system 200 may include model 250 comprising muscle sensor input transformation component 252 be configured for transforming the biometric data into model input data for further processing. For example, muscle sensor input transformation component 252 may receive biometric data from computing device 220 via network 210 and determine ad scoring data corresponding to a user's eye movements relative to media content displayed on a user interface of computing device 220. In an embodiment, the biometric measurements may include inputs from multiple sensors located in positions to capture relative movements of the head and muscular tension of facial muscle groups that indicate a change in the eyes' focus. For example, muscle sensor input transformation component 252 may be configured for perform noise identification and filtering. Further, muscle sensor input transformation component 252 may be configured to perform a transformation of the inputs to only muscle tensions by separating the physical movement to the tension changes and then computing the coupling effect between the physical movement and the muscular tension for the different muscle groups. The pre-configured inputs (i.e., distance between the screen and the eye, the zoom level of the content, etc.) may be used in the transformation to obtain the vision focus and relate the temporal values to a score for the ad content.

In an embodiment, system 200 may include model 250 comprising gross and fine motor split model 254 configured for determining facial feature gross motor movements and fine motor movements. For example, biometric data corresponding to facial feature movements may be transmitted to gross and fine motor split model 254 as model input data, wherein gross and fine motor split model 254 may be configured to process the biometric data to generate model output data corresponding to a classification of the biometric data as either gross motor movements or fine motor movements. Further, gross and fine motor split model 254 may be configured to obtain the exact focus position of the eye based on determining a split between the gross motor movements and the fine motor movements, especially if the ad contains text images and camera images are not available.

In an embodiment, the gross motor movements may include head, shoulder, and neck movements and the fine motor movements may include eye, eyebrow, forehead, nose, cheeks, lips, and chin movements. For example, a range of movements combined with muscular tension changes may be used to determine the focus and intensity of the user's attention and may be dependent on the viewer's vision absorption patterns. For instance, one viewer could move the head down and from one side to another while viewing the ad, while another may have no significant head/neck/chin movements, but the eye muscles move the eyeball across the area measured from the muscle tension changes in the eye and on the eyebrows, forehead and temples. In an embodiment, obtaining inputs on the distance to the screen and also the image zoom level, the different movements and tension changes may enable determination of the starting co-ordinates of the eye on the ad space and movement across the space by using the physical movements and the gross muscle tension changes. The determination of intensity changes at different points/areas on the ad from the fine motor changes with the gross movement across the ad space may be configured to enable computation of a message communication score for a viewing instance of the ad.

In an embodiment, system 200 may include spatio-temporal eye focus component 260 configured to determine a discrete set of eye focus locations in both space and time. For example, spatio-temporal eye focus component 260 may be configured to receive model output data from model 250 and process the model output data to determine specific locations where eyes are focused and an amount of time in which the eyes were focused at the specific locations. For example, biometric sensor 230 may be configured to measure retinal sensitivity at different visual field locations (e.g., perimetry) to perform eye tracking and generate biometric data including the eye tracking measurements. Spatio-temporal eye focus component 260 may include a trained deep recurrent neural network (RNN) configured to accurately predict (e.g., time-point-wise predictions) the subject of eye focus wherein the distance between the eye and stimulus positions, at a given time point, is caused by the presence of a subject of focus. Herein, the ML model may be configured to correlate the spatio-temporal biometric measurements and a display space with content and ads to determine if an ad catches the attention and if the user dwells for more time with attention measured by the fine motor muscle movements towards a specific part of the screen.

In an embodiment, system 200 may include ad effectiveness component 270 configured to determine an ad effectiveness score based on output data from spatio-temporal eye focus component 260 and output data from ad spatial distribution component 240. In an embodiment, ad effectiveness component 270 may include a machine learning model configured to process model input data and generate model output data corresponding to an ad effectiveness score indicating a user's level of engagement with an ad. For example, model input data to ad effectiveness component 270 may include facial feature spatial and temporal measurements and ad feature data. Further, ad effectiveness component 270 may be configured to generate model output data corresponding to visual capture score clusters, wherein some score clusters may include high interest, high information gained, high interest with low information is gained, medium interest with high information is gained, medium interest with medium/low information is gained, short span but high information is gained, wherein the score clusters may be mapped to sales of the product or service featured in the ad. In an embodiment, these divisions or clusters may be configured to assist the ad company in deciding about where to place the ad or some visually appealing content on which part of the screen. If the ad requires high interest and high information gain, which is in most cases, the ad company may now know which part of the screen is ideal to place the ad or the visually appealing content. Also, if the best possible position is not available, the one or more processors may be configured to determine how to optimize the screen position based on these score clusters.

In an embodiment, system 200 may be configured to compensate for individual variations in the gross clusters to obtain an attention span and an amount of time spent focusing on the ad. The gross clusters may be indicative of the message conveyed by the ad, independent of the subjective factors (e.g., user's prior knowledge of the product/service, desire for more information about the product/service) that may contribute to a user's attention on the ad.

In an embodiment, system 200 may include machine learning models configured to receive training data comprising initial measurements corresponding to ad features provided by the ad agency. For example, initial measurements may include ad position, expected display devices, sensor locations during measurement, etc. Further, multiple training data sets may be prepared and employed in training the machine learning models. Training data may be obtained using the machine learning model on known subjects and verifying the KPI score with a manual question and answer approach to fine tune the output clusters.

In an embodiment, system 200 may include machine learning models configured to generate model output data corresponding to output clusters defined based on the text messaging beyond visual aspects. For example, the model output data may correspond to output clusters of text images indicating styles and types of text messaging that will be important for gaining viewer engagement. Further, the model output data may correspond to positions on the screen that may make the viewer much more engaged because of the positioning of the text and what kind of texts viewers are reading. Furthermore, the model output data may include the output clusters in a format such that the actual text message and their corresponding font size and font type may be compared to the output clusters.

Figure 3:
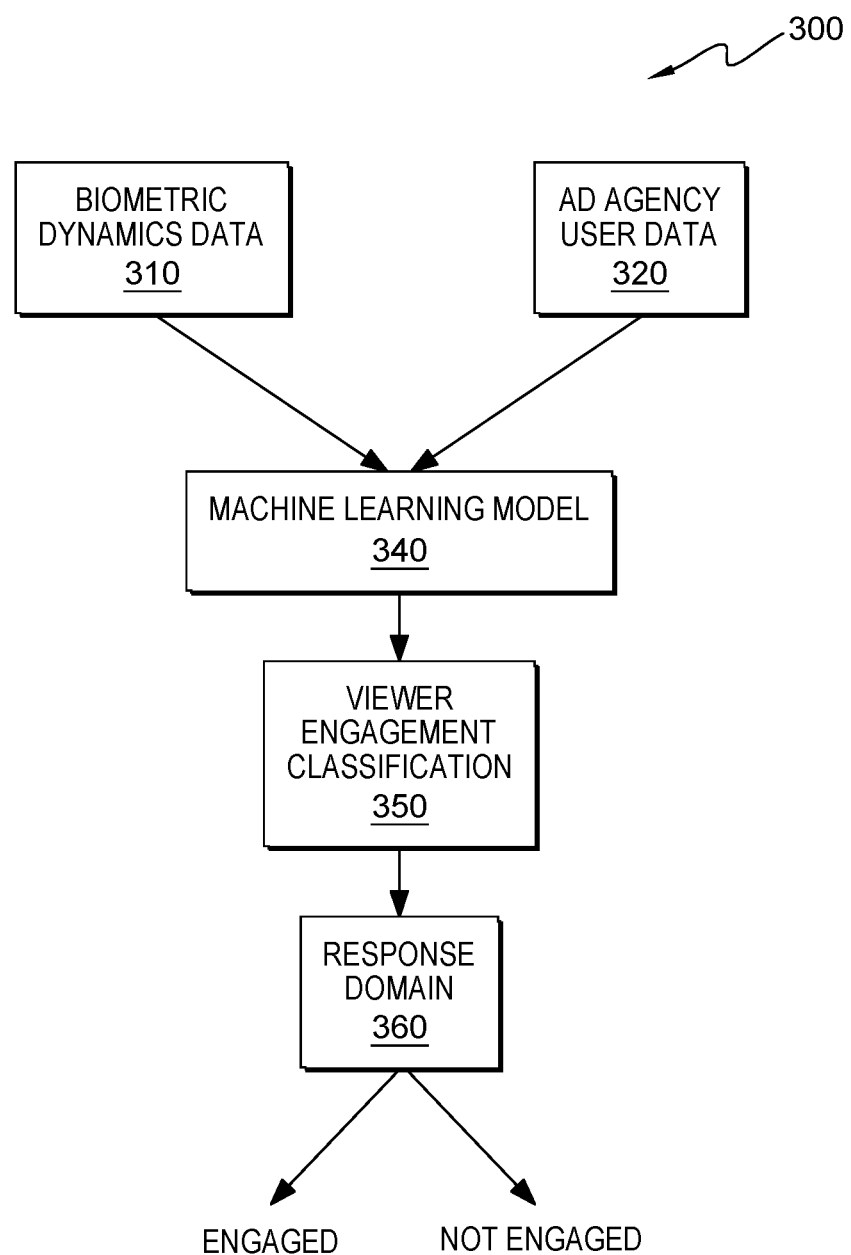
FIG. 3 depicts a first machine learning model for cognitively improving advertisement effectiveness, in accordance with an embodiment of the present invention.

FIG. 3 depicts a first machine learning model 300 for cognitively improving advertisement effectiveness, in accordance with an embodiment of the present invention.

In at least some embodiments, the model 300 may implement a trained component or trained model configured to perform the processes described above. The trained component may include one or more machine learning models, including but not limited to, one or more classifiers, one or more neural networks, one or more probabilistic graphs, one or more decision trees, and others. In other embodiments, the trained component may include a rules-based engine, one or more statistical-based algorithms, one or more mapping functions or other types of functions/algorithms to determine whether a natural language input is a complex or non-complex natural language input. In some embodiments, the trained component may be configured to perform binary classification, where the natural language input may be classified into one of two classes/categories. In some embodiments, the trained component may be configured to perform multiclass or multinomial classification, where the natural language input may be classified into one of three or more classes/categories. In some embodiments, the trained component may be configured to perform multi-label classification, where the natural language input may be associated with more than one class/category.

Various machine learning techniques may be used to train and operate trained components to perform various processes described herein. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Embodiments described herein may include multiple feature selection algorithms to perform automatic feature selection. For example, Pearson correlation filtering, Chi-squared filtering, or Kullback-Leibler divergence may be used to perform automatic feature selection.

Embodiments described herein may include one or more models to choose from for a specific application based on certain application parameters. For example, application parameters may include complexity/simplicity of the problem, computational constraints (e.g., space and time) on training/testing, and problem characteristics (e.g., feature independence/dependence, amount of data noise, stochasticity, stationarity), among others. Each model may have a set of hyper-parameters that may be tuned to optimize training (e.g., feature mapping function, number of hidden neurons).

Embodiments described herein may include various types of machine learning models and techniques for training the machine learning models. For example, supervised learning techniques may be used on shallow models (e.g., SVM, k-nearest neighbor (kNN), random forest, decision tree, naïve Bayes) to serve as a baseline for comparison with deep learning models. Further, embodiments described herein may include performing grid search to fine-tune the hyper-parameters for SVM models, kNN models, or multi-later perceptron (MLP) models.

Embodiments described herein may include deep learning models to emulate the bidirectional-Long Short-Term Memory (LSTM) model to provide state of the art results for Natural Language Processing (NLP) tasks. For example, in a conversational environment, both the front and back halves of a sentence may be analyzed to provide the context to help in determining the meaning or intent of a sentence. Thus, a bidirectional-LSTM may provide improved results in analyzing the sentence in both front and back portions as opposed to a uni-directional LSTM.

In an embodiment, model 300 may be configured to receive model input data comprising biometric dynamics data 310 and ad agency data 320, process the model input data by machine learning model 340, and generate model output data corresponding to viewer engagement classification 350. Further, model 300 may configured to determine whether the viewer engagement classification falls within response domain 360 of the viewer being engaged or not engaged with the content of the ad.

In an embodiment, biometric dynamic data 310 may include biometric activity corresponding to a user's eye movements, facial feature movements, and brain activity (e.g., electrical pulses). Ad agency user data 320 may include ad feature data, ad user data, or any other data that an ad agency may have about the ad and the target user for the ad.

Figure 4:
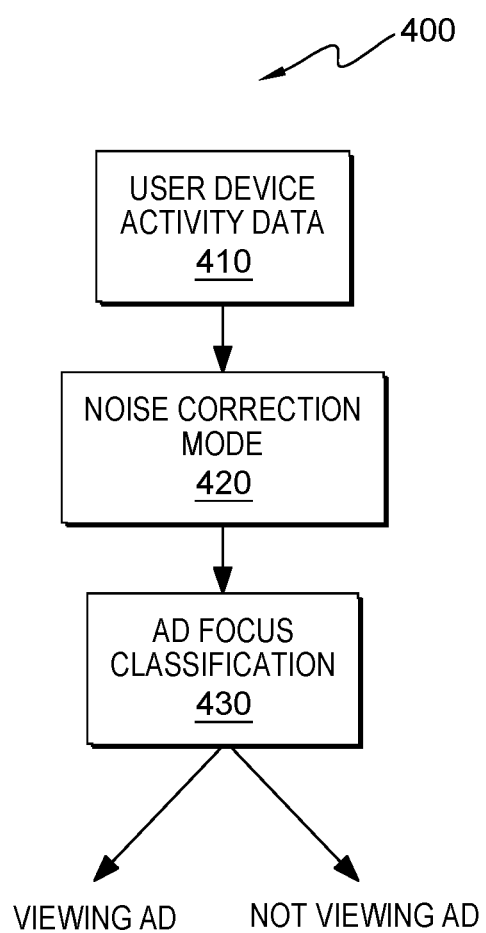
FIG. 4 depicts a second machine learning model for cognitively improving advertisement effectiveness, in accordance with an embodiment of the present invention.

FIG. 4 depicts a second machine learning model 400 for cognitively improving advertisement effectiveness, in accordance with an embodiment of the present invention.

In an embodiment, model 400 may be configured for receiving user device activity data 410 corresponding to user activity detected at a user device. For example, user activity may include an indication that the user is interacting with a software application executing on the user device. Further, user activity may include an indication that the user is viewing content displayed on a user interface of user device.

In an embodiment, model 400 may include noise correction model 420 configured to receive model input data comprising user device activity data 410, process user activity data 410, and generate model output data corresponding to ad focus classification 430 indicating whether the user is viewing the ad or not viewing the ad. For example, user activity data 410 may include data corresponding to a first software application executing on the user device and a second software application executing on the user device at the same time, wherein the first software application includes an ad that is the subject of the study. Further, user activity data 410 may include data corresponding to the user's attention to the user interface of the user device, wherein the user's attention may be focused on a display of the user interface or focused away from the display of the user interface. Therefore, noise correction model 420 may be configured to generate model output data corresponding to ad focus classification 430, indicative of whether the user is focused on the ad or not focused on the ad.

Figure 5:
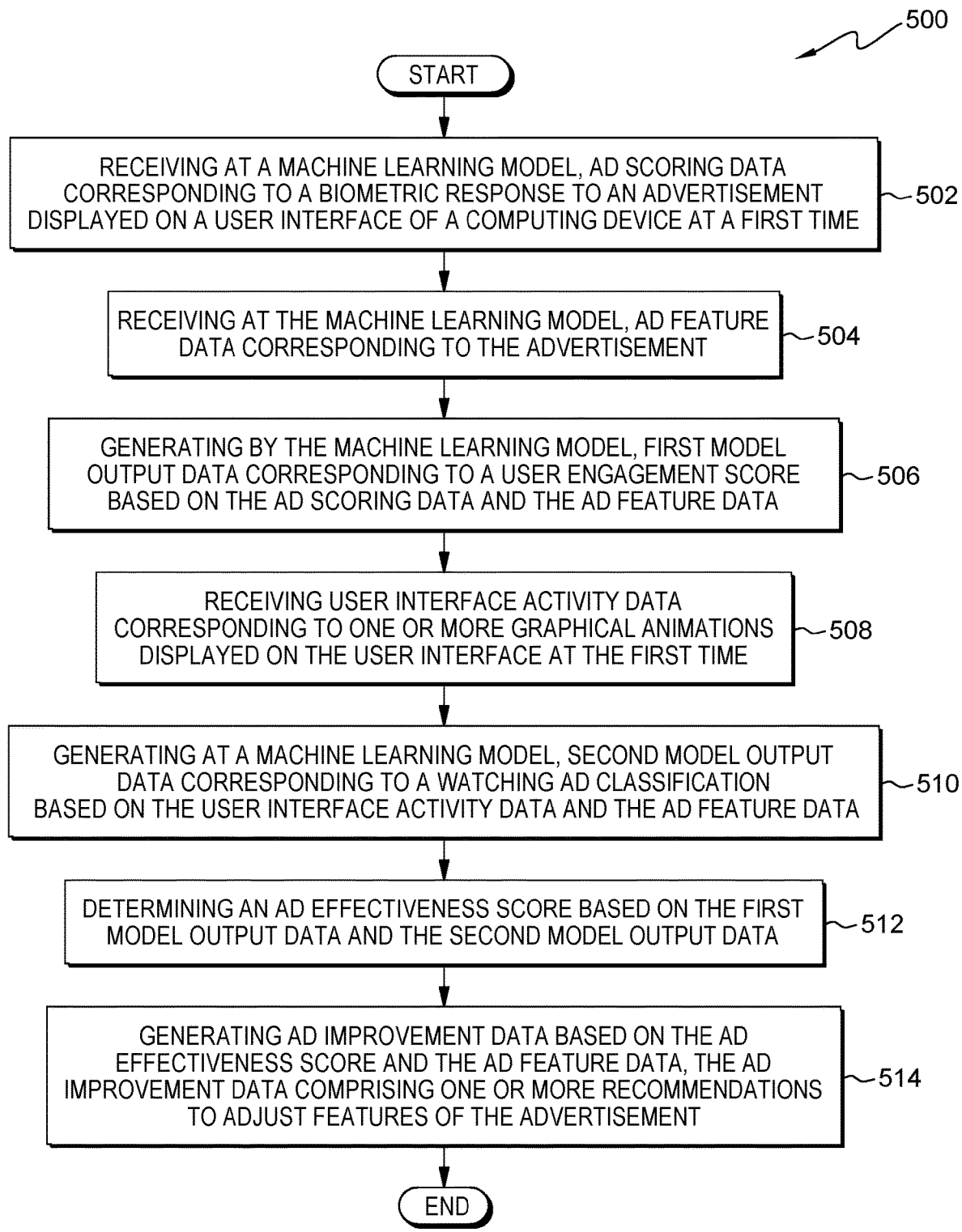
FIG. 5 depicts a flowchart of a computer-implemented method for cognitively improving advertisement effectiveness, in accordance with an embodiment of the present invention.

FIG. 5 depicts a flowchart of a computer-implemented method 500 for cognitively improving advertisement effectiveness, in accordance with an embodiment of the present invention.

In an embodiment, computer-implemented method 500 may include one or more processors configured for receiving 502, at a first machine learning model ad scoring data corresponding to a biometric response to an advertisement displayed on a user interface of a computing device at a first time. For example, the biometric response may include facial feature measurements captured at the first time, as described above herein.

In an embodiment, computer-implemented method 500 may include one or more processors configured for receiving 504 at the first machine learning model, ad feature data corresponding to features of the advertisement. For example, the ad feature data may include one or more of color scheme, element types, element position, and dynamic features, as described above herein.

In an embodiment, computer-implemented method 500 may include one or more processors configured for generating 506, by the first machine learning model, first model output data corresponding to a user engagement score based on the ad scoring data and the ad feature data. For example, the user engagement score may be based at least on an eye position of the user focused on an ad element at the element position at the first time.

In an embodiment, computer-implemented method 500 may include one or more processors configured for receiving 508 user interface activity data corresponding to one or more graphical images displayed on the user interface at the first time. For example, the user interface activity data may correspond to user activity detected at the user device, the user activity comprising user interaction with a software application executing the graphical images on the user device, as described above herein.

In an embodiment, computer-implemented method 500 may include one or more processors configured for generating 510, at a second machine learning model, second model output data corresponding to a watching ad classification based on the user interface activity data and the ad feature data. For example, the watching ad classification may correspond to either a viewing ad classification or a not viewing ad classification, as described above herein.

In an embodiment, computer-implemented method 500 may include one or more processors configured for determining 512 an ad effectiveness score based on the first model output data and the second model output data.

In an embodiment, computer-implemented method 500 may include one or more processors configured for generating 514 ad improvement data based on the ad effectiveness score and the ad feature data, the ad improvement data comprising one or more recommendations to adjust one or more features of the advertisement.

In an embodiment, computer-implemented method 500 may include one or more processors configured for displaying the one or more recommendations on a display of the user interface. For example, the one or more recommendations may be displayed as a report or organized layout of instructions adjustments to the ad features determined to be less effective in engaging the user with the ad. Further, the one or more recommendations may be displayed as a report including charts or graphs indicating effectiveness of each identifiable ad feature so that the ad agency may make appropriate adjustments to increase the effectiveness of the ad.

In an embodiment, computer-implemented method 500 may be configured to store the one or more recommendations and include the one or more recommendations in later iterations of training the machine learning models to improve ad effectiveness determinations.

Figure 6:
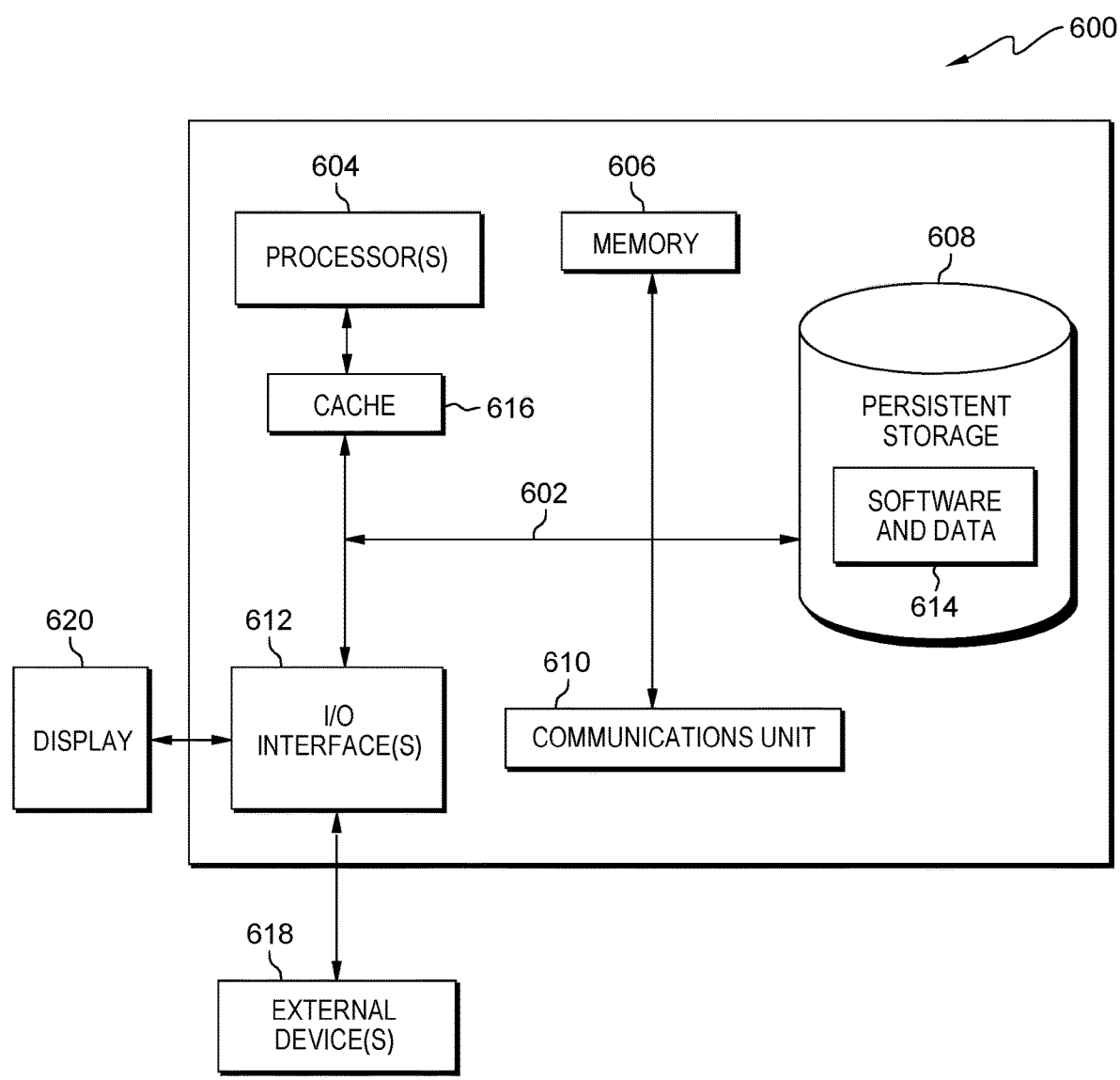
FIG. 6 depicts a block diagram of a computing device of distributed network environment, in accordance with an embodiment of the present invention.

FIG. 6 depicts a block diagram of a computing device of distributed computing environment, in accordance with an embodiment of the present invention. FIG. 6 depicts a block diagram of computing device 600 suitable for server(s) 125 and computing device 120, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 600 includes communications fabric 602, which provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Programs may be stored in persistent storage 608 and in memory 606 for execution and/or access by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Programs, as described herein, may be downloaded to persistent storage 608 through communications unit 610.

I/O interface(s) 612 allows for input and output of data with other devices that may be connected to computing device 120. For example, I/O interface 612 may provide a connection to external devices 618 such as biometric sensor 130, a keyboard, a keypad, a touch screen, and/or some other suitable input device. External devices 618 can also include portable computer readable storage media such as, for example, thumb drives, portable optical or magnetic disks, and memory cards. Software and data 614 used to practice embodiments of the present invention can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

Predictive model or predictive algorithm described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a computer system, a computer-implemented method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method, comprising:
   measuring, by one or more processors, facial feature muscular movements of a user viewing a display of a device, the facial feature muscular movements being at least part of biometric data received at the one or more processors, wherein the biometric data includes capturing eye muscle movement;
   determining, by one or more processors, focus points based, at least in part on, angular displacement of the eye muscle movement corresponding to an advertisement having ad feature data and being featured on the display;
   training, by one or more processors, a deep recurrent neural network with the biometric data and the determined focus points to determine the user's eye focus is on an ad, based at least in part on the eye muscle movement and ad feature data;
   generating, by a machine learning model, a first model output of a user engagement score based on the ad feature data and the determined focus points;
   generating, by one or more processors, by the machine learning model, second model output data corresponding to a watching ad classification based on the user the determined focus points and the ad feature data;
   determining, by one or more processors, an ad effectiveness score based on the first model output data and the second model output data; and
   generating, by one or more processors, one or more recommendations to adjust one or more features of the ad based on the ad effectiveness score and the ad feature data.

2. The computer-implemented method of claim 1, wherein the biometric data includes facial feature measurements.

3. The computer-implemented method of claim 1, wherein the ad feature data is selected from a group consisting of color scheme, element types, element position, and dynamic features.

4. The computer-implemented method of claim 3, wherein the user engagement score is based at least on an eye position of a user focused on an ad element at the element position.

5. The computer-implemented method of claim 1, wherein the user interface activity data further corresponds to user activity detected at the computing device, the user activity comprising user interaction with a software application executing the graphical images on the user device.

6. The computer-implemented method of claim 1, wherein the watching ad classification corresponds to a selection from the group consisting of: a viewing ad classification and a not viewing ad classification.

7. The computer-implemented method of claim 1, further comprising:
   displaying, by one or more processors, the one or more recommendations to adjust one or more features of the ad on a display of the user interface.

8. A computer program product, comprising:
   one or more computer readable storage media and program instructions collectively stored on the one or more computer readable storage media, the stored program instructions comprising:
   program instructions to measure facial feature muscular movements of a user viewing a display of a device, the facial feature muscular movements being at least part of biometric data received at the one or more processors, wherein the biometric data includes capturing eye muscle movement;
   program instructions to determine focus points based, at least in part on, angular displacement of the eye muscle movement corresponding to an advertisement having ad feature data and being featured on the display;
   program instructions to train a deep recurrent neural network with the biometric data and the determined focus points to determine the user's eye focus is on an ad, based at least in part on the eye muscle movement and ad feature data;

program instructions to generate, by a machine learning model, a first model output of a user engagement score based on the ad feature data and the determined focus points;

program instructions to receive user interface activity data corresponding to one or more graphical images displayed on the user interface;

program instructions to generate, at by the machine learning model, second model output data corresponding to a watching ad classification based on the user interface activity data and the ad feature data;

program instructions to determine an ad effectiveness score based on the first model output data and the second model output data, wherein the effectiveness score indicates a user's level of engagement with the ad; and program instructions to generate one or more recommendations to adjust one or more features of the ad based on the ad effectiveness score and the ad feature data.

9. The computer program product of claim 8, wherein the biometric data includes facial feature measurements.

10. The computer program product of claim 8, wherein the ad feature data comprises data that is selected from a group consisting of color scheme, element types, element position, and dynamic features.

11. The computer program product of claim 10, wherein the user engagement score is based at least on an eye position of a user focused on an ad element at the element position.

12. The computer program product of claim 8, wherein the user interface activity data further corresponds to user activity detected at the computing device, the user activity comprising user interaction with a software application executing the graphical images on the computing device.

13. The computer program product of claim 8, wherein the watching ad classification corresponds to either a viewing ad classification or a not viewing ad classification.

14. The computer program product of claim 8, further comprising:

program instructions to display the one or more recommendations to adjust one or more features of the ad on a display of the user interface.

15. A computer system, comprising:

one or more computer processors;

one or more computer readable storage media;

program instructions collectively stored on the one or more computer readable storage media for execution by at least one of the one or more computer processors, the stored program instructions comprising:

program instructions to measure facial feature muscular movements of a user viewing a display of a device, the facial feature muscular movements being at least part of biometric data received at the one or more processors, wherein the biometric data includes capturing eye muscle movement;

program instructions to determine focus points based, at least in part on, angular displacement of the eye muscle movement corresponding to an advertisement having ad feature data and being featured on the display;

program instructions to train a deep recurrent neural network with the biometric data and the determined focus points to determine the user's eye focus is on an ad, based at least in part on the eye muscle movement and ad feature data;

program instructions to generate, by a machine learning model, a first model output of a user engagement score based on the ad feature data and the determined focus points;

program instructions to receive user interface activity data corresponding to one or more graphical images displayed on the user interface;

program instructions to generate, at by the machine learning model, second model output data corresponding to a watching ad classification based on the user interface activity data and the ad feature data;

program instructions to determine an ad effectiveness score based on the first model output data and the second model output data, wherein the effectiveness score indicates a user's level of engagement with the ad; and program instructions to generate one or more recommendations to adjust one or more features of the ad based on the ad effectiveness score and the ad feature data.

16. The computer system of claim 15, wherein the biometric data includes facial feature measurements.

17. The computer system of claim 15, wherein the ad feature data comprises data that is selected from a group consisting of color scheme, element types, element position, and dynamic features.

18. The computer system of claim 17, wherein the user engagement score is based at least on an eye position of a user focused on an ad element at the element position.

19. The computer system of claim 15, wherein the user interface activity data further corresponds to user activity detected at the computing device, the user activity comprising user interaction with a software application executing the graphical images on the user device.

20. The computer system of claim 15, further comprising:

program instructions to display the one or more recommendations to adjust one or more features of the ad on a display of the user interface, wherein the watching ad classification corresponds to either a viewing ad classification or a not viewing ad classification.

\* \* \* \* \*